United States Patent [19]
Briffod

[11] Patent Number: 6,159,543
[45] Date of Patent: *Dec. 12, 2000

[54] PROCESSES FOR MANUFACTURING WIRES WITH A BRASS SURFACE

[75] Inventor: Jean Paul Briffod, Lucinges, France

[73] Assignee: Charmilles Technologies SA, Meyrin, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/762,446

[22] Filed: Dec. 9, 1996

[30] Foreign Application Priority Data

Nov. 12, 1995 [CH] Switzerland ............... 3490/95

[51] Int. Cl.[7] .................................................. C23C 14/24
[52] U.S. Cl. .................. 427/250; 427/251; 427/255.4; 427/124; 427/406; 427/117
[58] Field of Search .............................. 427/59, 250, 251, 427/255.4, 124, 406, 117

[56] References Cited

U.S. PATENT DOCUMENTS

| | | | |
|---|---|---|---|
| 3,637,421 | 1/1972 | Gimigliano | 117/107 |
| 3,860,444 | 1/1975 | Donckel et al. | 118/718 |
| 4,686,153 | 8/1987 | Tominaga et al. | 428/610 |
| 4,977,303 | 12/1990 | Briffod | 219/69.12 |
| 5,721,414 | 2/1998 | Lacourelle . | |

FOREIGN PATENT DOCUMENTS 63-18072  1/1988  Japan .

*Primary Examiner*—Timothy Meeks
*Attorney, Agent, or Firm*—Burns, Doane, Swecker & Mathis, L.L.P.

[57] ABSTRACT

A process for the manufacture of wires with a brass surface and a predefined zinc content for application in wire electroerosion. Wire (32) made of copper or brass is passed through heated treatment chamber (14) filled with a zinc vapor, wherein the zinc in gas phase diffuses in wire (32). The concentration of zinc in gas phase and the temperature ($T_D$) of wire (32) in treatment chamber (14) are regulated in such a way that the zinc content of the brass phase forming on the surface of the wire suitably corresponds to the predefined zinc content.

5 Claims, 1 Drawing Sheet

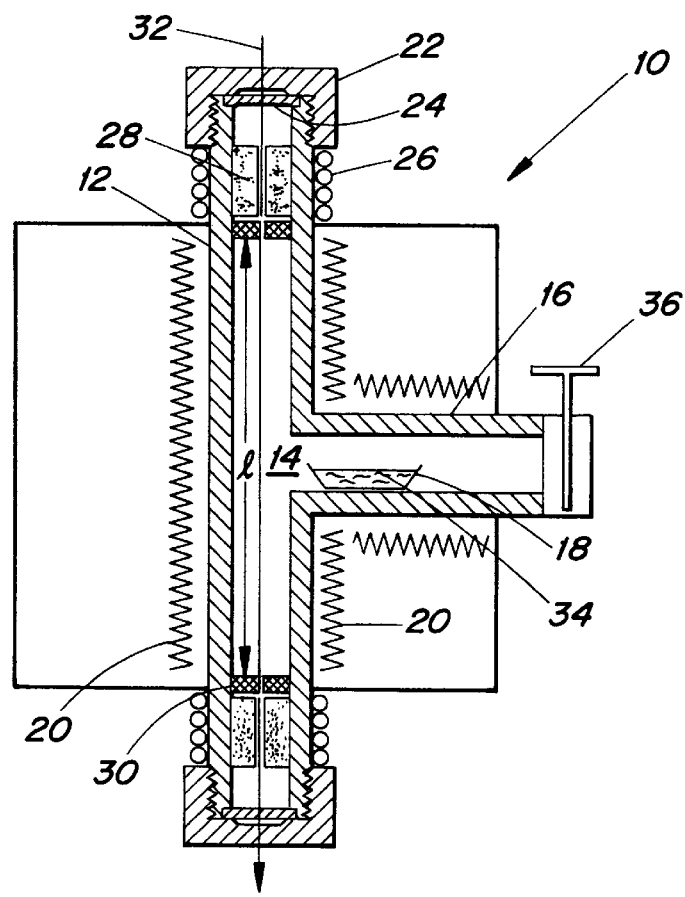
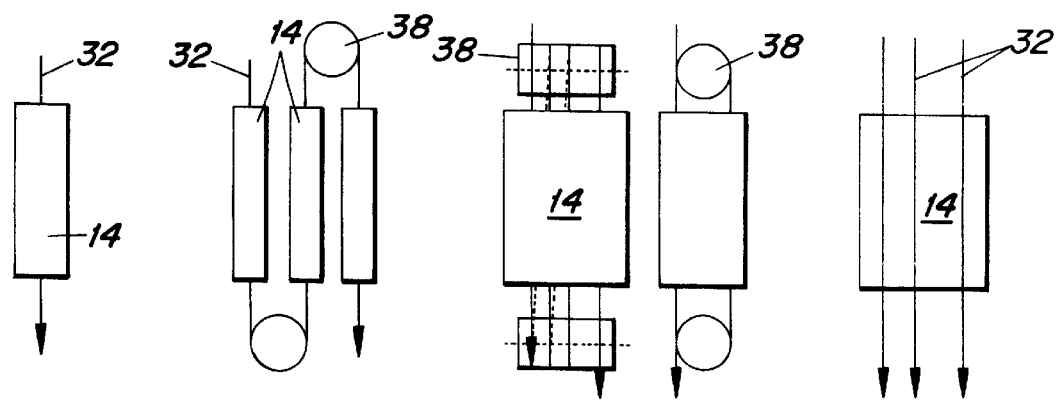

PROCESSES FOR MANUFACTURING WIRES WITH A BRASS SURFACE

FIELD OF THE INVENTION

The invention relates to a process allowing one to manufacture wires with a brass surface with a predefined zinc content, for the purpose of wire electroerosion. The invention also includes a device that implements this process.

BACKGROUND OF THE INVENTION

For wire electroerosion, a brass wire or a wire coated with brass is ordinarily used. According to a known manufacturing process, the copper wire is first zinc-plated by galvanization, and then this plate copper wire is heated in a furnace. One thus obtains diffusion of the zinc deposited by galvanization into the copper wire, with the brass phase produced (on the whole) at least on the surface of the wire. This two-step manufacturing process represents a great investment and high operation costs, with the consequence of a high manufacturing cost for the brass wire.

SUMMARY OF THE INVENTION

Given these facts, the inventor proposed to develop a process as described above, as well as a device implementing this process, allowing one to obtain a brass alloy (phase) with a predefined zinc content on a copper or brass wire at an advantageous price and in a simple manner.

In the procedure, the solution invented for this task is presented in this way: a copper or brass wire is passed into a heated treatment chamber filled with zinc vapor, which, in gas phase, diffuses into the wire. The concentration of zinc in gas phase and the temperature of the wire in the treatment chamber must be regulated in such a way that the zinc content of the brass phase generated on the surface of the wire suitably corresponds to the predetermined zinc content.

The process of the invention is based on the physical principle according to which a metal in the solid state is at equilibrium with its saturation vapor. Each modification of the initial conditions leads to a new state of equilibrium. If, for example, one modifies the partial vapor pressure of the zinc above a brass alloy for a given temperature, a new equilibrium is established in the solid brass phase, with a modified zinc content.

To form the solid brass phase on the surface of the wire with a predefined zinc content the partial vapor pressure of the zinc in gas phase $P_{zn,g}$ can be adjusted in such a way that this pressure $P_{zn,g}$ is identical with the partial vapor pressure of the zinc in wire $P_{zn,f}$ in the treatment chamber which corresponds to the predefined zinc content of the wire surface during the formation of the solid brass phase.

However, the predetermined content of zinc in brass phase on the surface of the wire can also be regulated and controlled by the temperature of the wire in the treatment chamber.

For practical reasons, the partial vapor pressure of the zinc in gas phase is regulated as saturation vapor pressure through the temperature of the liquid zinc in the treatment chamber. To do this, in the treatment chamber, the wire can be brought to a temperature higher than that of the liquid metallic phase or that predominating in the treatment chamber.

To regulate the partial vapor pressure of the zinc in gas phase, it is possible to use an alloy of zinc and another metal instead of pure zinc in liquid metallic phase. A zinc/tin alloy is particularly advantageous. Using the zinc alloy instead of pure zinc, one succeeds in regulating the partial vapor pressure of the zinc in gas phase not only by means of the temperature of the liquid metallic phase but also by varying the composition of the alloy. This system gives a greater range of control because in brass phase, it allows one to regulate the zinc content on the surface of the wire, on one hand by acting on the temperature and on the other hand by modifying the concentration of the liquid metallic phase, in order to obtain the predetermined zinc content. It goes without saying that by modification of the temperature of the wire alone, it is possible to regulate the zinc content in brass phase to the predetermined value.

In the use of an alloy, it is obviously necessary to make sure that the loss of zinc is compensated for by a regular addition of this metal.

For the fine adjustment of the properties of the brass phase on the surface of the wire, it is possible to use in the treatment chamber other metals provided in the wire in the form of liquid alloys which can evaporate and which diffuse from the gas phase into the wire.

The process of the invention allows one to form one or more diffusion layers over the section of the wire while modifying the zinc content. Likewise, it is possible to define the length of time spent by the copper wire in the treatment chamber in such a way that a brass phase forms over the entire section of the wire.

For its implementation, the process of the invention requires a suitable device consisting of a treatment chamber with at least one furnace (with a continuous fire) in which tanks are arranged for the liquid metallic phases. Moreover, it is possible to provide installations so that at least one wire can pass several times or in several steps.

BRIEF DESCRIPTION OF THE DRAWINGS

Other advantages, characteristics, and details of the invention will appear in the following descriptions of selected examples of applications, as well as through the drawing which is included; this drawing represents schematically FIG. 1: the cross section of a furnace (with a continuous fire) intended for the treatment of wires;

FIGS. 2, 3, 4A, 4B, & 5: 2–5 different variants for the guiding of the wire

DESCRIPTION OF THE PREFERRED EMBODIMENTS

Furnace (with a continuous flame) 10 is composed (see FIG. 1) of actual furnace 12 in the form of a vertical cylinder with treatment chamber 14, to which is added secondary furnace 16 with container 18 containing liquid metallic phase 34. The elements of the furnaces 12 and 16 are heated indirectly by electrical resistors 20 located on the external surface of the furnace elements 12 and 16.

The ends of the cylindrical furnace element 12 terminate with flange 22 with the insertion of gasket 24, with an opening for the passage of wire 32 as the only opening. Also at the ends, the cylindrical furnace element 12 has cooling pipes 26 on the outside and copper blocks 28 on the inside. The actual treatment chamber 14 is limited to length l of 1–2 m at the two ends by, for example, screens 30 consisting of a heat insulating material.

Secondary furnace 16 is equipped with valve 36 for filling container 18 or adding liquid metallic phase 34 to it.

The operating conditions in treatment chamber 14 of the furnace (with a continuous fire) 10 are selected as is known by varying the composition of liquid metallic phase 34, which can be, for example, a zinc-tin alloy, as well as the temperature $T_{fl}$ of liquid metallic phase 34 of the treatment chamber 14 and, if necessary, the temperature $T_D$ of wire 32 of treatment chamber 14, taking into account the predetermined content of zinc of the brass phase to be produced on the surface of the wire.

For partial vapor pressures of zinc, the necessary corresponding temperatures and concentrations are dealt with in the specialized literature relating to the phases and state diagrams concerning the systems of alloys in consideration here.

For the regulation of a brass phase β on the surface of a wire, it is possible, for example, to choose the following conditions:

Temperature of zinc in the liquid state $T_{fl}$=990 K

Temperature of the wire $T_D$=1100 K

Under these conditions, the partial vapor pressure $P_{Zn,g}$ of zinc in gas phase corresponds to the partial vapor pressure $P_{Zn,f}$ of zinc in the brass phase β on the surface of the wire.

Length l of treatment chamber 14 as well as the transit rate of wire 32 through treatment chamber 14 determine the treatment duration which in turn determines the thickness of the brass phase deposited by diffusion on the surface of the wire. There are different ways of varying the treatment duration, which allows one to obtain a diffusion of the whole section of the wire.

Since the maximum length l of treatment chamber 14 is limited to about 2 m for technical reasons, it is possible to increase the treatment duration or to increase the transit rate of the wire by connecting several treatment chambers consecutively according to FIG. 3. Another possibility (see FIGS. 4*a* and *b*) consists of passing wire 32 through treatment chamber 14 several times, by means of return rollers 38. Finally, it is also possible to imagine (see FIG. 5) several wires 32 moving together through the same treatment chamber 14.

What is claimed is:

1. A process for the manufacture of wire having a surface of brass with a predetermined zinc content, said process comprising the steps of:

a) providing a metal wire selected from the group consisting of copper wire and brass wire;

b) providing a first furnace having a treatment chamber and a means for heating said metal wire;

c) providing a second furnace having a liquid container, said liquid container having molten zinc disposed therein and a means for heating the liquid container;

d) providing untrottled and open communication between said second furnace and said treatment chamber;

e) heating the liquid container in said second furnace to create a zinc vapor in said second furnace, whereby said zinc vapor is freely communicated without throttling into the first furnace through the treatment chamber;

f) passing the metal wire through the treatment chamber of said first furnace so as to expose said wire to the zinc vapor so that the zinc vapor diffuses into the metal wire thereby forming a brass phase on an outer surface of the metal wire;

g) heating the metal wire in the treatment chamber; and h) regulating the temperature of the metal wire in said first furnace and the temperature of the liquid container in said second furnace such that the zinc content of the brass phase equals the predetermined zinc content.

2. The process according to claim 1, wherein the partial pressure of the zinc vapor in the treatment chamber is the saturation vapor pressure of the molten zinc at the temperature of the liquid container.

3. The process according to claim 1, wherein the molten zinc takes the form of a molten zinc alloy.

4. The process according to claim 3, wherein the zinc alloy is a zinc-tin alloy.

5. The process according to claim 1, wherein the temperature of the wire is higher than the temperature of the liquid container.

* * * * *